United States Patent
Erb et al.

(10) Patent No.: US 10,822,092 B2
(45) Date of Patent: Nov. 3, 2020

(54) HEADREST DEVICE

(71) Applicant: RECARO Aircraft Seating GmbH & Co. KG, Schwaebisch Hall (DE)

(72) Inventors: Andreas Erb, Schwaebisch Hall (DE); Christopher Tute, Schoenborn (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 15/729,799

(22) Filed: Oct. 11, 2017

(65) Prior Publication Data

US 2018/0099754 A1 Apr. 12, 2018

(30) Foreign Application Priority Data

Oct. 12, 2016 (DE) .................. 10 2016 119 469

(51) Int. Cl.
*B64D 11/06* (2006.01)
*B60N 2/882* (2018.01)
*A47C 7/38* (2006.01)

(52) U.S. Cl.
CPC .......... *B64D 11/0647* (2014.12); *B60N 2/882* (2018.02); *B64D 11/0646* (2014.12); *A47C 7/383* (2013.01)

(58) Field of Classification Search
CPC ............ B64D 11/0647; B64D 11/0646; B60N 2/882; A47C 7/383
USPC ........................ 297/397, 188.03, 393; 5/639
See application file for complete search history.

(56) References Cited

U.S. PATENT DOCUMENTS

| | | | |
|---|---|---|---|
| 2,983,310 A | 5/1961 | Warlick et al. | |
| 5,015,036 A * | 5/1991 | Fergie | B60N 2/882 297/397 |
| 5,345,633 A | 9/1994 | Harnish | |
| 6,386,639 B1 * | 5/2002 | McMichael | A47D 15/006 297/219.12 |
| 6,668,407 B1 * | 12/2003 | Reitzel | A47C 1/14 5/639 |
| 7,627,916 B1 * | 12/2009 | Gielow | A47C 16/00 297/393 |
| 7,628,456 B1 * | 12/2009 | Swartz | A47C 7/383 297/393 |
| 7,726,735 B2 * | 6/2010 | Resendez | B60N 2/6063 297/228.11 |

(Continued)

FOREIGN PATENT DOCUMENTS

| | | |
|---|---|---|
| AU | 565 990 B3 | 10/1987 |
| DE | 10 2011 083 626 A1 | 3/2013 |
| WO | 00/38946 A1 | 7/2000 |
| WO | 2015/026408 A1 | 2/2015 |

OTHER PUBLICATIONS

Search Report dated Jun. 27, 2017 issued in corresponding DE patent application No. 10 2016 119 469.7 (and partial English translation).

(Continued)

*Primary Examiner* — Syed A Islam

(74) *Attorney, Agent, or Firm* — Posz Law Group, PLC

(57) ABSTRACT

A headrest device for a seat, in particular for an airplane seat, with a headrest implementing at least one head support zone. The headrest device comprises at least one fixation module with at least one fixation means, which is configured to arrange at least one personal item in the head support zone.

8 Claims, 6 Drawing Sheets

(56) References Cited

U.S. PATENT DOCUMENTS

Figure 1:
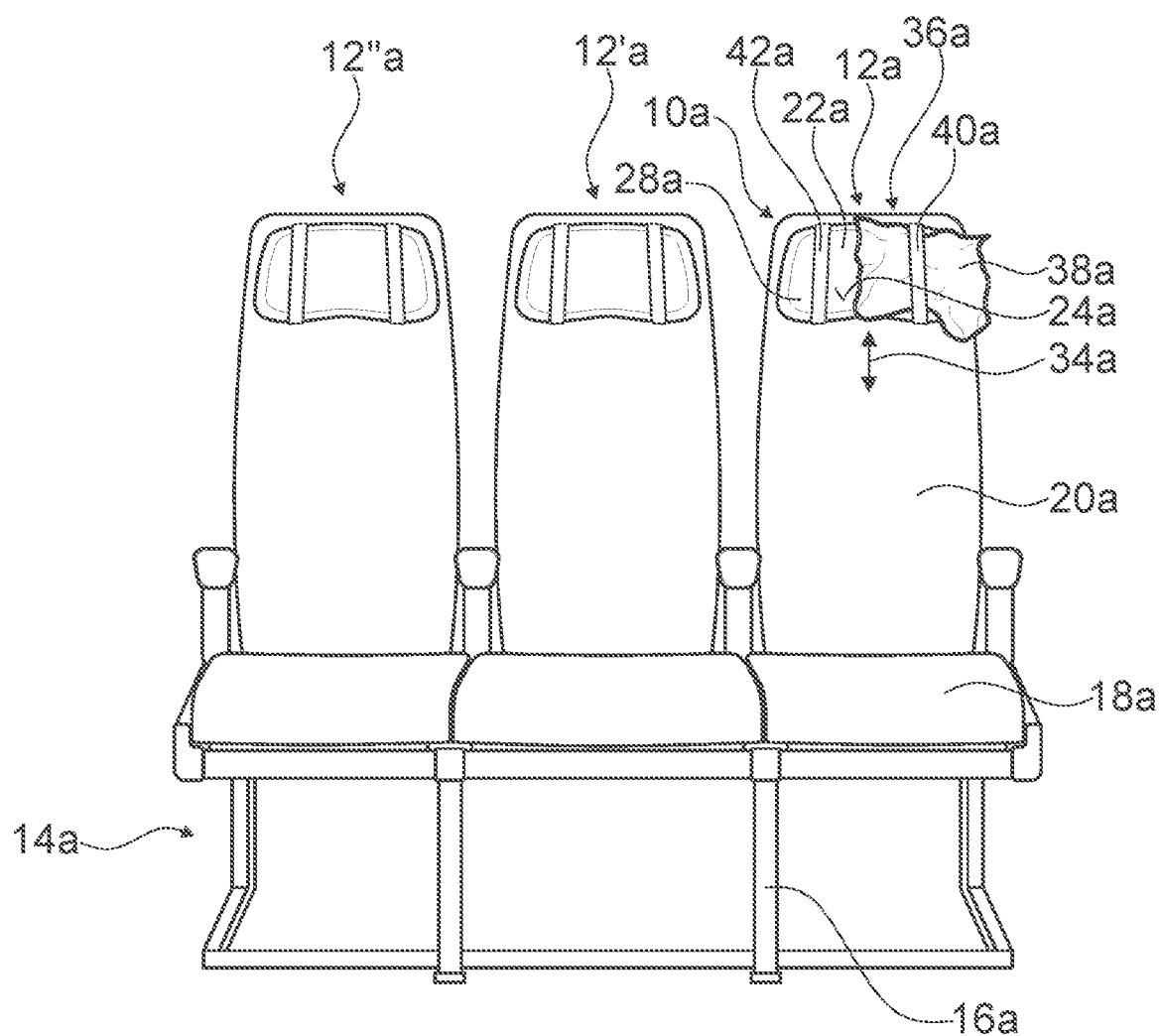

| | | | |
|---|---|---|---|
| 9,968,198 B2* | 5/2018 | Hauer | A47C 7/383 |
| 2001/0044329 A1* | 11/2001 | Newsom | B60R 11/0217 |
| | | | 455/569.2 |
| 2002/0163240 A1* | 11/2002 | Cheng | A47C 7/383 |
| | | | 297/397 |
| 2003/0106156 A1* | 6/2003 | Long | B44C 1/10 |
| | | | 5/636 |
| 2004/0124685 A1 | 7/2004 | Buch | |
| 2006/0076810 A1 | 4/2006 | Nichols | |
| 2009/0039689 A1* | 2/2009 | Smith | B60N 2/6081 |
| | | | 297/220 |
| 2009/0065540 A1 | 3/2009 | Pantoja | |
| 2014/0284972 A1 | 9/2014 | Riedel et al. | |
| 2015/0123433 A1 | 5/2015 | Lamb, Jr. et al. | |

OTHER PUBLICATIONS

Search Report dated Dec. 22, 2017 issued in corresponding EP patent application No. 17196238.4 (and partial English translation).
Vematro tablet holder for headrest. 2015.
Walser 30085 Car Cloth Hanger. Retrieved Dec. 18, 2017.
Office Action dated Jan. 31, 2019 issued in corresponding EP patent application No. 17 196 238.4 (and English translation).
Office action dated Aug. 14, 2019 issued in corresponding EP patent application No. 17 196 238.4 (and English translation thereof).
European Office Action dated Mar. 20, 2020 issued in corresponding EP patent application No. 17 196 238.4 (and English translation thereof).

* cited by examiner

HEADREST DEVICE

CROSS REFERENCE TO RELATED APPLICATION

This application is based on and incorporates herein by reference German Patent Application No. 10 2016 119 469.7 filed on Oct. 12, 2016.

STATE OF THE ART

The invention relates to a headrest device according to the preamble of patent claim 1.

A headrest device for a seat, in particular for an airplane seat, with a headrest implementing at least one head support zone, has already been proposed.

The objective of the invention is in particular to provide a generic device with improved characteristics regarding a comfort for a passenger. The objective is achieved, according to the invention, by the features of patent claim 1 while advantageous implementations and further developments of the invention will become apparent from the subclaims.

Advantages of the Invention

The invention is based on a headrest device for a seat, in particular for an airplane seat, with a headrest implementing at least one head support zone.

It is proposed that the headrest device comprises at least one fixation module with at least one fixation means, which is configured to arrange at least one personal item in the head support zone. By an "airplane seat" is herein in particular a seat to be understood which is configured to be mounted in an airplane cabin of an airplane on a cabin floor and which a passenger may sit on during a flight. Herein the airplane seat comprises at least a seat bottom, a backrest that is coupled with the seat bottom and a headrest, wherein the backrest is preferably pivotably connected to the seat bottom, as a result of which the airplane seat is preferentially movable into different functional positions. It is principally also conceivable that the backrest and the seat bottom are rigidly coupled with one another. By a "headrest" is herein in particular an element or a device to be understood which is configured to allow a passenger sitting on the airplane seat to support his head and/or his nape region on it. Herein it is conceivable that the headrest is implemented as a separate element, which is connected to the backrest and is, for example, adjustable in height with respect to the backrest and/or comprises pivotable side elements. Principally it is however also conceivable that the headrest is embodied in a one-part implementation with the backrest and is in particular implemented by the same element as the backrest, e.g. by a composite material with a cushioning or by a frame with a covering. By a "head support zone" is herein in particular a region to be understood which a passenger rests upon with his head when supporting himself on the headrest with his head. By a "fixation module" is herein in particular a module to be understood which is composed of at least one element or means, like in particular a fixation means, wherein the fixation means is configured to allow at least one element to be fixated to it in at least one position and is thus connectable to the headrest. A "fixation means" is herein to be in particular to be understood as an element or means that is configured to be fixated to a carrier element, e.g. in particular the headrest, while fixating further objects, like in particular personal items of a person sitting on the seat, to the carrier element at least temporarily. Herein a fixation means is in particular embodied as an at least partly elastic strap, the fixation means being implemented to be elastically deformable to a large extent or to be elastically deformable only minimally. Herein "elastically deformable to a large extent" is to mean a possible elastic change in length of 20% to 40%. "Minimally elastically deformable" is herein to mean a maximally possible elastic change in length of 1% to 5%. Principally it is also conceivable that a fixation means is embodied as a bag or a net, wherein the elements that are to be fixated may be clamped by the bag or net in a space spanned between the bag or net and the carrier element. By a "personal item" is herein in particular an object to be understood that is allocated to a passenger sitting on the seat, for example a pillow, a piece of clothing, e.g. a jacket or a pullover, a blanket or another personal item that is deemed expedient by someone skilled in the art. It is herein conceivable both that the personal item has been brought by the passenger sitting on the seat or that the personal item has been given to the passenger by a company providing the seat, like in particular an airline, specifically for the use of the passenger. "Configured" is in particular to mean designed and/or equipped. By an object being configured for a certain function is in particular to be understood that the object fulfills and/or implements said certain function in at least one application state and/or operating state. By an implementation according to the invention a passenger may advantageously arrange a personal item in the head support zone of the headrest, for the purpose of thus achieving a head support zone that is individually adapted and is hence implemented in a manner that is especially comfortable for the passenger. This advantageously allows increasing a comfort of the seat.

It is further proposed that the at least one fixation means is configured for arranging a personal item laterally in the head support zone. "Laterally in the head support zone" is herein in particular to mean in a region that is located, viewed in a transverse direction, on a lateral end of the headrest. A transverse direction is herein oriented orthogonally to a sitting direction and to a vertical direction. In this way advantageously a lateral support by the personal item is achievable, thus allowing in particular to dispense with additional structural components on the headrest, e.g. laterally mounted pivotable wings. This in particular allows providing a cost-competitive lightweight headrest device.

It is moreover proposed that the fixation module comprises at least two fixation means which are arranged on opposite sides of the head support zone. "Opposite sides of the head support zone" is herein to mean on opposite lateral ends of the headrest, in particular viewed in a transverse direction. In this way the fixation means are especially advantageously arrangeable for connecting personal items.

It is further proposed that the at least one fixation means is embodied in such a way that it is elastically elongateable. "Elastically elongateable" is herein in particular to mean that the elastic fixation means is elastically elongateable at least in its main extension direction by at least 5%, preferably by at least 10% and, in an especially advantageous implementation, by at least 20%. Herein the elastic elongation is generated by a force acting on the fixation means from an outside, for example by a passenger pulling on the fixation means. The fixation means returns into its original state on cessation of the acting force unless another element prevents this. In this way the fixation means may be embodied in a particularly simple, intuitively operable manner.

Furthermore it is proposed that the at least one fixation means comprises at least one connecting means via which the fixation means is connectable to the headrest. By a "connecting means" is herein in particular a force-fit and/or form-fit element to be understood, via which the fixation means is connectable to the headrest in a force-fit and/or form-fit manner on the headrest. For removing the fixation means, a force-fit and/or form-fit connection via which the fixation means is connected to the headrest is non-destructively separable from the headrest. A "connecting means" is herein preferably embodied as a hook-and-loop fastener strap, a press stud, a seam, a through hole or another force-fit and/or form-fit element that is deemed expedient by someone skilled in the art. Herein the fixation means and the headrest respectively comprise connecting means which are implemented to correspond to each other and are connectable to each other in a force-fit and/or form-fit fashion for connection. In this way the fixation means is advantageously separable from the headrest, for example for being laundered or for being exchanged in case of a defect.

It is also proposed that the fixation module is embodied as a single module that is separate from the headrest. By a "separate single module" herein in particular an element is to be understood which is embodied separately from the headrest and is in particular not fixedly fastened to the headrest. This advantageously allows implementing the fixation module as a giveaway provided by an airline.

Beyond this it is proposed that the headrest comprises at least one additional cover element, which is configured to be arranged on the headrest together with the fixation module. By an "additional cover element" is herein in particular a protective cover, a so-called antimacassar, to understood, which covers the basic cover at least in a partial region of a head support zone of the headrest, to protect the basic cover in particular from wear and from soiling. The additional cover element is herein preferentially arranged in a middle region of the head support zone, in which a passenger's head is most frequently supported. "Arranged together with the fixation module" is herein in particular to mean that the additional cover element is at least partly, preferably completely connected to the headrest or to a cover element of the headrest via the same connecting means. In this way advantageously an additional cover element may be rendered available which is especially easily connectable to the headrest together with the fixation module.

Furthermore it is proposed that the fixation means comprises at least one elastic portion and an inelastic portion. Herein the at least one elastic portion is in particular configured to be arranged in a non-visible region of the headrest. In particular advantageously the at least one elastic portion of the fixation means is arranged underneath or inside a cover of the headrest. Principally it is also conceivable that the elastic portion of the fixation means is arranged at least partly in an interior of the headrest. In this way the fixation means is implementable in a particularly advantageous manner.

It is also proposed that the at least one elastic portion is arranged on a rear side of the headrest. This allows arranging the elastic portion of the fixation means in a particularly advantageous manner.

The headrest device according to the invention is herein not to be limited to the application and implementation form described above. In particular, the headrest device according to the invention may, for fulfilling a functionality herein described, comprise a number of respective elements, structural components and units that differs from a number that is mentioned herein.

DRAWINGS

Further advantages will become apparent from the following description of the drawings. In the drawings nine exemplary embodiments of the invention are shown. The drawings, the description and the claims contain a plurality of features in combination. Someone skilled in the art will purposefully also consider the features separately and will find further expedient combinations.

Figure 2:
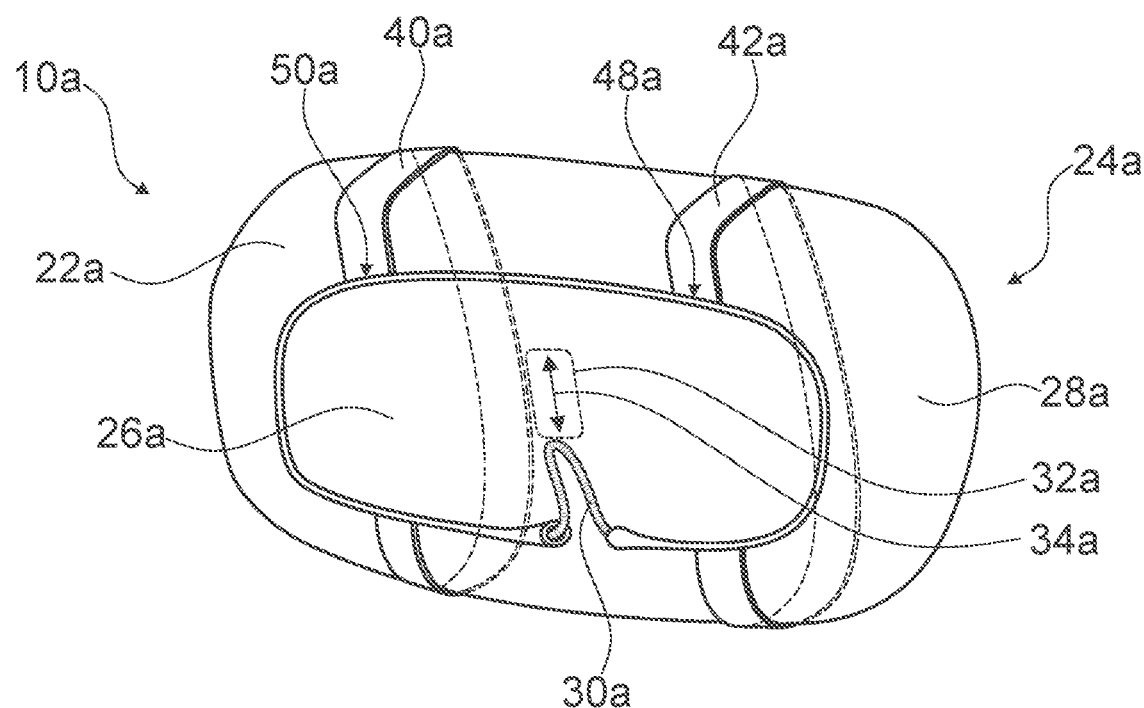
Figure 3:
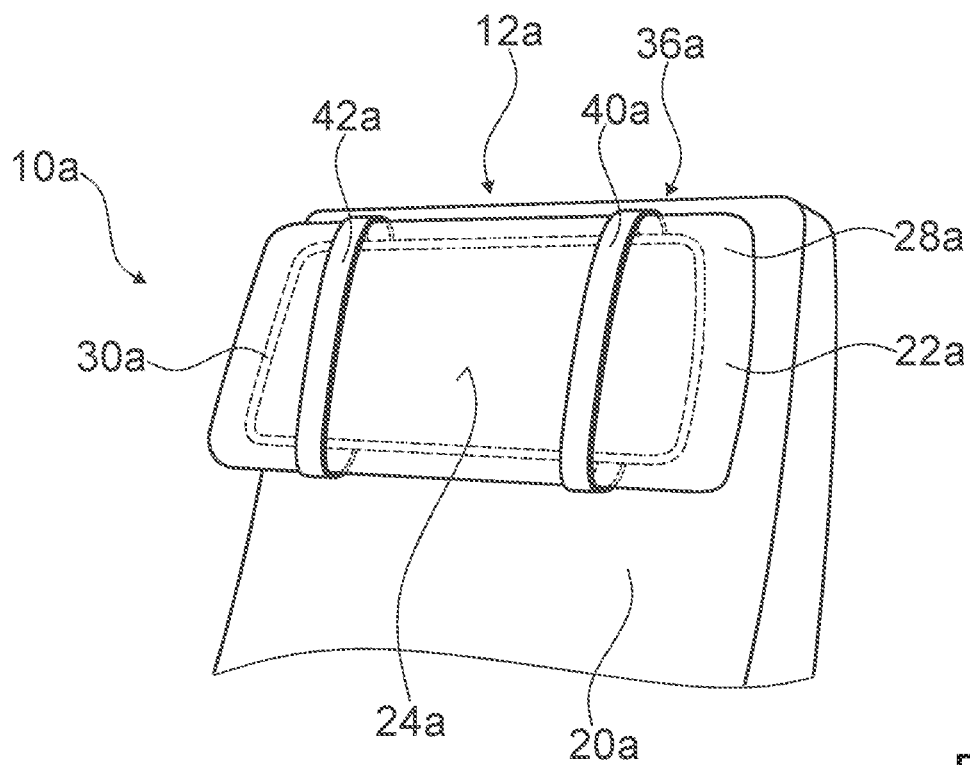
Figure 4:
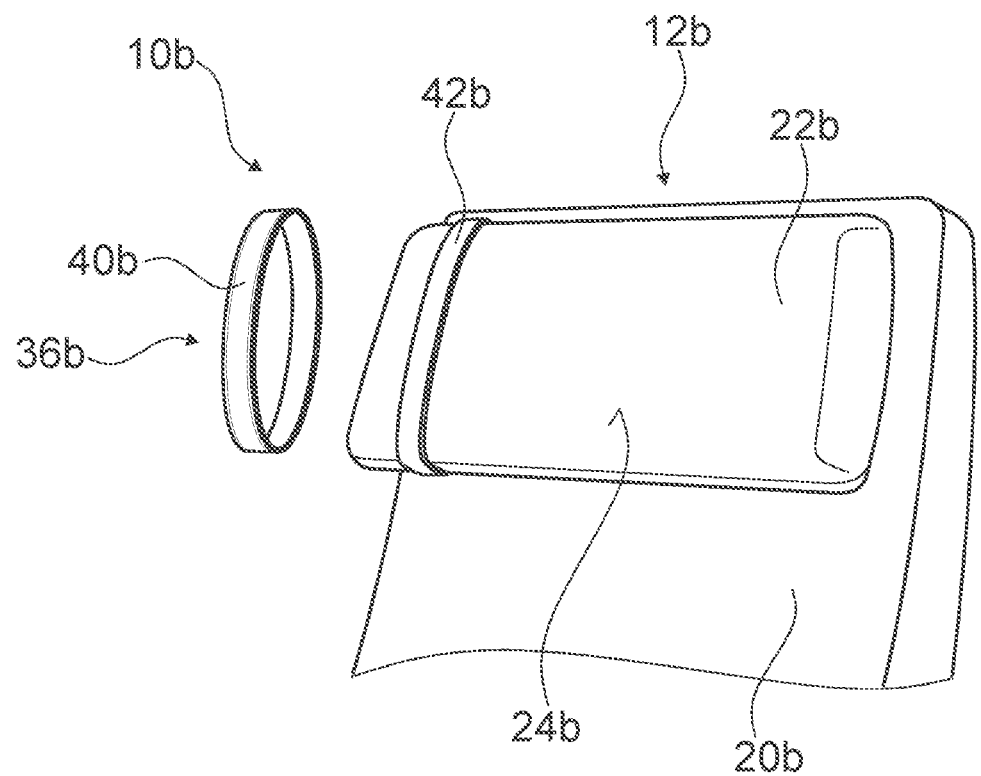
Figure 5:
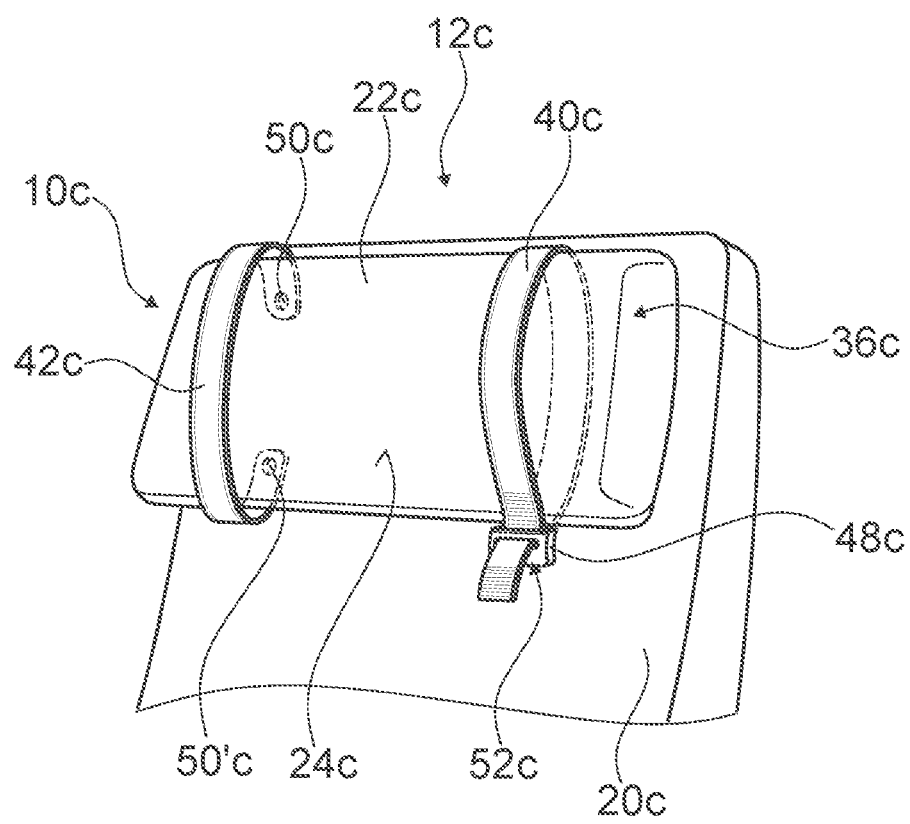
Figure 6:
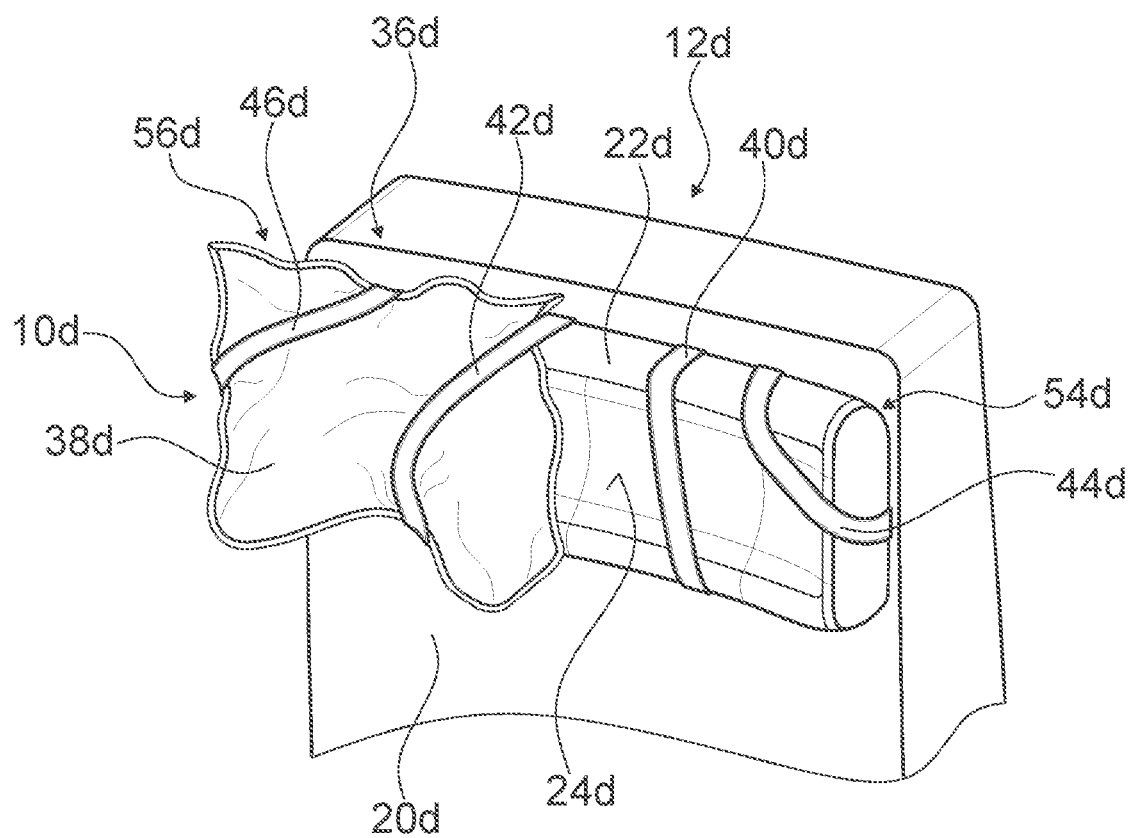
Figure 7:
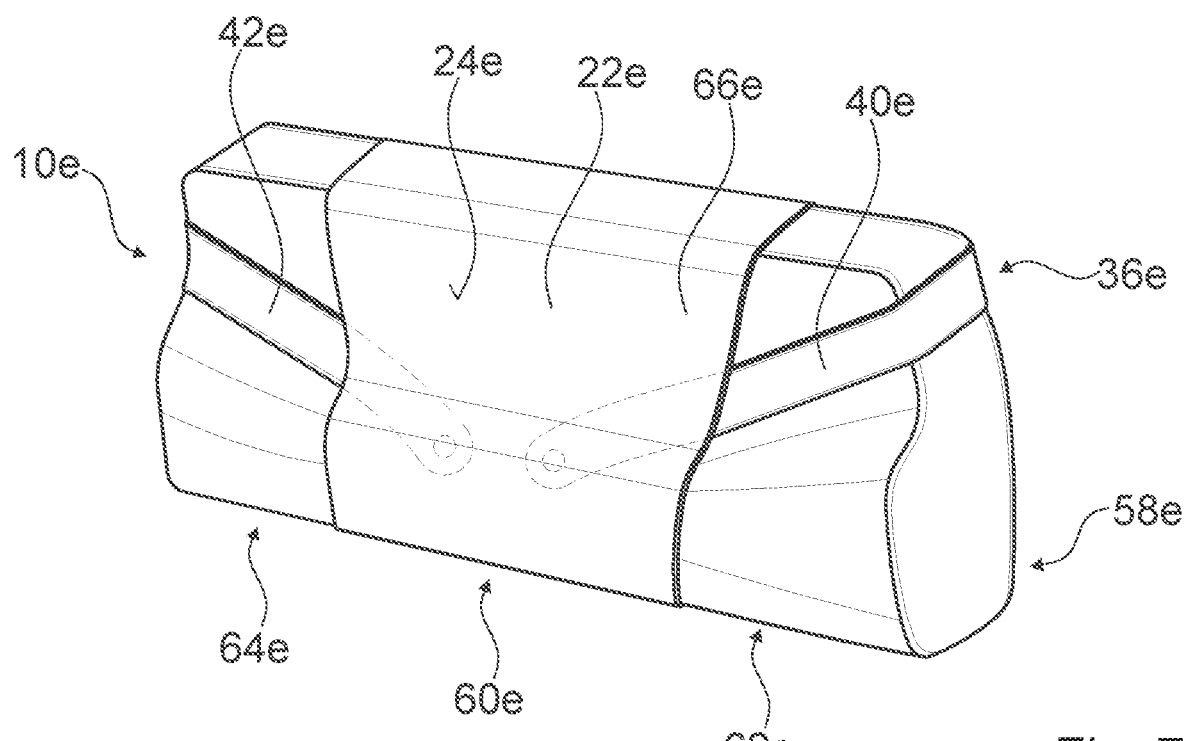
Figure 8:
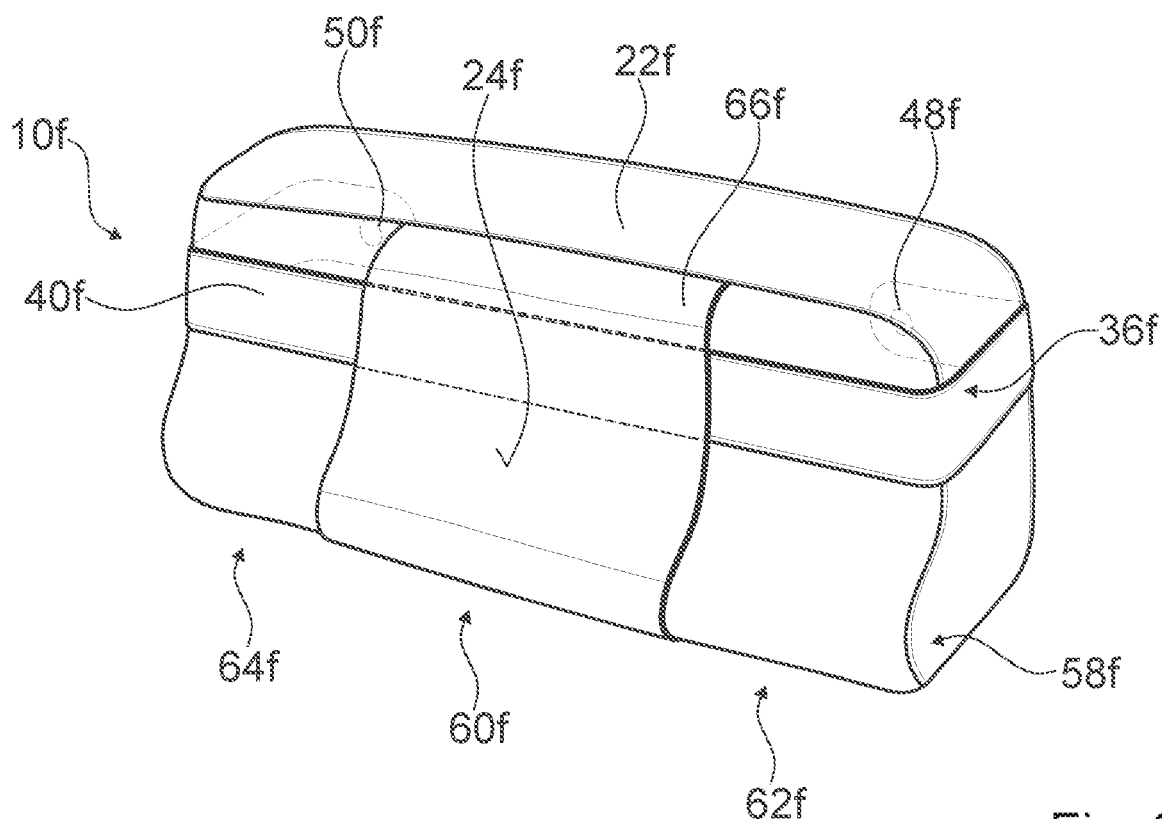
Figure 9:
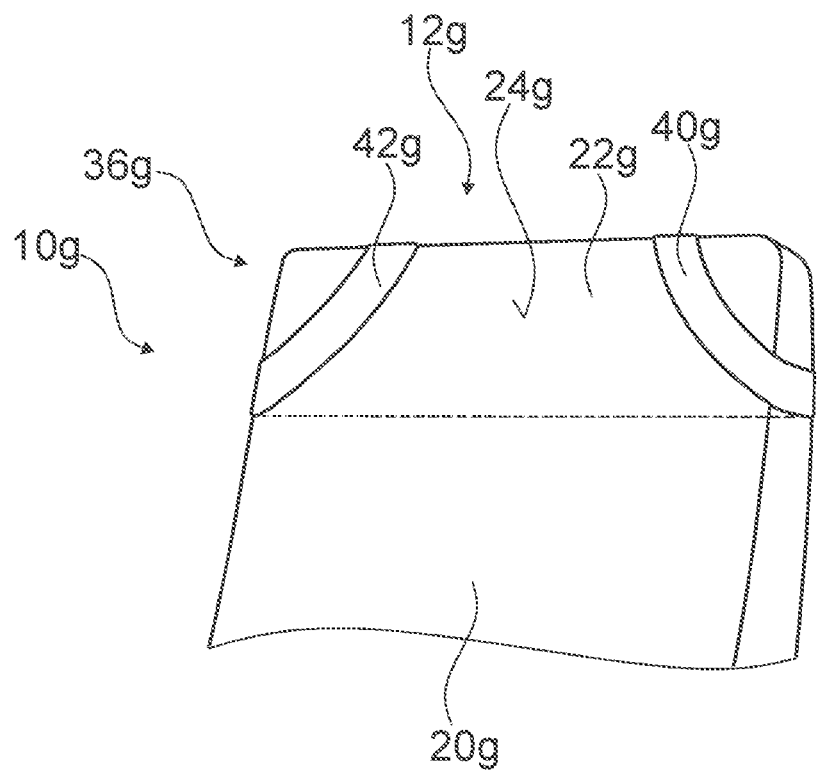
Figure 10:
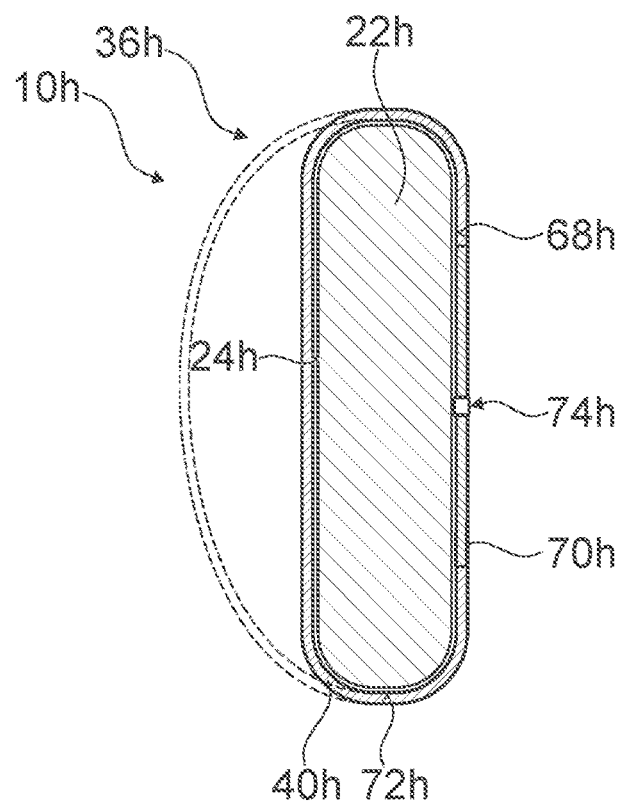
Figure 11:
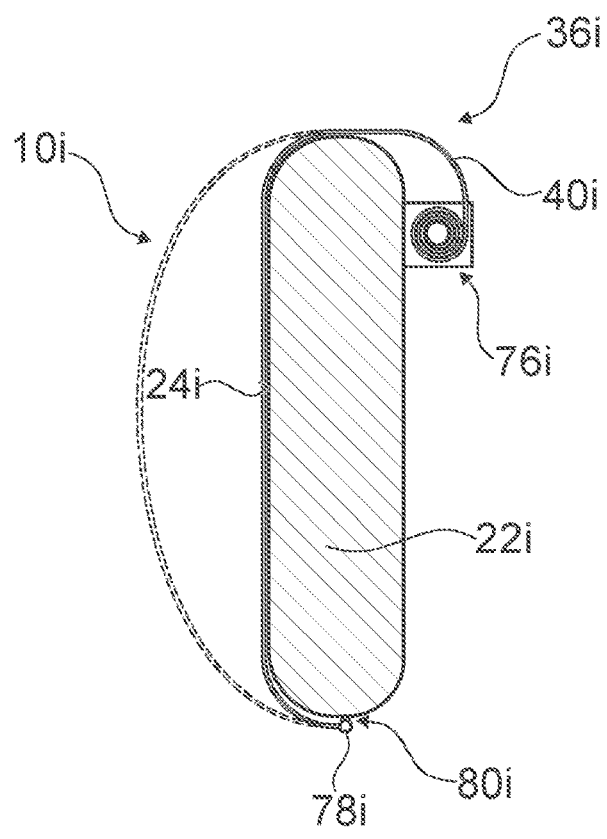

It is shown in:

FIG. 1 a schematic view of a seat row with a plurality of seats, each of which comprising a headrest device according to the invention, in a first exemplary embodiment, FIG. 2 a view of a headrest of the headrest device from the rear, FIG. 3 a schematic illustration of the headrest of the headrest device, from the front, FIG. 4 a schematic illustration of a seat with a headrest device according to the invention, in a second exemplary embodiment, FIG. 5 a schematic illustration of a seat with a headrest device according to the invention, in a third exemplary embodiment, FIG. 6 a schematic illustration of a seat with a headrest device according to the invention, in a fourth exemplary embodiment, FIG. 7 a schematic illustration of a headrest with a headrest device according to the invention, in a fifth exemplary embodiment, FIG. 8 a schematic illustration of a headrest with a headrest device according to the invention, in a sixth exemplary embodiment, FIG. 9 a schematic illustration of a seat with a headrest device according to the invention, in a seventh exemplary embodiment, FIG. 10 a schematic sectional illustration of a headrest with a headrest device according to the invention, in an eighth exemplary embodiment, and FIG. 11 a schematic sectional illustration of a headrest with a headrest device according to the invention, in a ninth exemplary embodiment.

DESCRIPTION OF THE EXEMPLARY EMBODIMENTS

In FIGS. 1 to 3 a first exemplary embodiment of a headrest device 10a according to the invention is depicted. The headrest device 10a is embodied as part of a seat 12a. The seat 12a is embodied as an airplane seat. The seat 12a embodied as an airplane seat is herein implemented as part of a seat row 14a. The seat row 14a comprises three seats 12a, 12'a, 12"a, the seats 12a, 12'a, 12"a being implemented substantially in the same manner, which is why in the following only the seat 12a will be described. Principally it would also be conceivable that the seat 12a is embodied as a single seat or as part of a seat row having a different number of seats 12a. The seat 12a comprises a mounting unit 16a. By means of the mounting unit 16a the seat 12a is mounted on a cabin floor. The cabin floor is herein implemented as part of an airplane cabin. The mounting unit 16a is herein embodied as a part of the entire seat row 14a. The seat 12a comprises a seat bottom 18a. The seat bottom 18a is coupled with the mounting unit 16a. The seat bottom 18a is configured to provide a sitting region for a passenger. The seat 12a comprises a backrest 20a. The backrest 20a is configured to provide a backrest surface which a passenger sitting on the seat 12a may support himself on with his back. The backrest 20a is coupled with the seat bottom 18a and the mounting unit 16a on its lower end. Herein it is conceivable that the backrest 20a is coupled with the seat bottom 18a and/or the mounting unit 16a directly or is coupled with the seat bottom 18a and/or the mounting unit 16a indirectly, via a further structural component, e.g. in particular a seat divider. It is herein conceivable that the seat bottom 18a and/or the backrest 20a are pivotable to the mounting unit 16a between a TTL position and a comfort position, or are merely fixated fixedly in a defined base position with respect to one another.

The headrest device 10a is part of the seat 12a and comprises a headrest 22a. The headrest 22a is arranged in an upper region of the backrest 20a. The headrest 22a is configured to implement a head support zone 24a for a passenger. The headrest 22a comprises a base body 26a. The base body 26a is embodied by a thin plate. Herein it is conceivable that the thin plate is embodied planar or has a curvature. The base body 26a is herein implemented of a composite material. Principally it is also conceivable that the base body 26a is implemented by a metal sheet. The headrest 22a comprises a comfort element (not shown in detail), which is mounted on a front side of the base body 26a. The comfort element is herein embodied of a foam element, e.g. a PU foam. Principally it is also conceivable that the comfort element is implemented of a different material which is deemed expedient by someone skilled in the art. The headrest 22a comprises a cover element 28a. In a mounted state, the cover element 28a is herein spanned over the base body 26a and the comfort element, forming the head support zone 24a. The cover element 28a is implemented of a fabric. Herein the cover element 28a completely covers the comfort element on a front side. On a rear side the cover element 28a comprises an opening loaded with a rubber element 30a by way of which the cover element 28a may be put over the base body 26a and the comfort element. Herein the cover element 28a is held on the base body 26a via the rubber element 30a. Principally it is also conceivable that the cover element 28a comprises one form-fit element or a plurality of form-fit elements, like for example press studs or a zip, via which it is possible to couple the cover element 28a with the base body 26a or to close the opening of the cover element 28a. The headrest 22a is herein fixedly connected to the backrest 20a. Herein the headrest 22a comprises a support unit 32a (not shown in detail), via which the headrest 22a is linearly adjustable in height, in a motion axis 34a, with respect to the backrest 20a in the upper portion of the backrest 20a.

The headrest device 10a comprises a fixation module 36a. The fixation module 36a is configured to allow at least one personal item 38a being arranged in the head support zone 24a. An item 38a is captively arrangeable on the headrest 22a by means of the fixation module 36a. In particular, an item 38a is connectable to the headrest 22a by means of the fixation module 36a via a clamping connection. This allows a passenger sitting on the seat 12a advantageously personalizing the head support zone 24a in such a way that it is as comfortable as possible for him. The personal item 38a is herein embodied, for example, as a pillow as shown in FIG. 1. Herein the personal item 38a embodied as a pillow may be factual property of the passenger sitting on the seat 12a, having been brought by said passenger. Principally it is also conceivable that the item 38a is embodied as a pillow handed out by an airline, in particular for a flight, and has to be given back by the passenger after the flight or may be kept by the passenger. Principally it is also conceivable that the personal item 38a is embodied as a piece of clothing, e.g. a pullover or a jacket.

For the purpose of mounting the personal item 38a in the head support zone 24a, the fixation module 36a comprises a first fixation means 40a and a second fixation means 42a. Principally it is also conceivable that the fixation module 36a comprises only one fixation means 40a, 42a. The fixation means 40a, 42a are herein arranged on opposite sides of the head support zone 24a. The fixation means 40a, 42a are embodied as straps. The fixation means 40a, 42a are herein in particular embodied as elastic straps. As a result, the fixation means 40a, 42a are embodied elastically elongateable. The fixation means 40a, 42a herein extend on a front side of the headrest 22a from an upper end to a lower end. Herein the fixation means 40a, 42a are oriented substantially in parallel to a vertical axis of the headrest 22a. Principally it is also conceivable that the fixation means 40a, 42a are oriented slightly inclined with respect to the vertical axis of the headrest 22a. The fixation means 40a, 42a are herein mounted on the cover element 28a of the headrest 22a. The fixation means 40a, 42a are herein connected to the cover element 28a on a rear side of the headrest 22a. For a connection to the headrest 22a, the fixation means 40a, 42a each comprise two connecting means 48a, 50a, via which the fixation means 40a, 42a are fixedly connected to the cover element 28a and thus to the headrest 22a. The connecting means 48a, 50a are herein respectively embodied as a seam. In this way the fixation means 40a, 42a are sewed with the cover element 28a for fixedly connecting to the headrest 22a. Principally it would also be conceivable that the fixation means 40a, 42a are fixedly connected, to the comfort element or to another part of the headrest 22a, via connecting means 48a, 50a which are embodied as seams.

By means of the fixation module 36a, a passenger sitting on the seat 12a may connect a personal item 38a to the headrest 22a via the fixation means 40a, as is depicted in FIG. 1. For this purpose, the passenger may elastically elongate the fixation means 40a by pulling on the fixation means 40a, as a result of which a space is created between the head support zone 24a of the headrest 22a and the fixation means 40a, into which space the passenger may introduce the item 38a. When the passenger has ceased the force on the fixation means 40a, the fixation means 40a contracts due to its inner tension resulting from being elastically expanded and returns towards its rest position on the headrest 22a, resulting in the item 38a being clamped between the fixation means 40a and the headrest 22a. As a result of this, the fixation means 40a holds the item 38a in the head support zone 24a of the headrest 22a. The passenger may herein shape the item 38a in such a way, while suitably positioning it by means of the fixation means 40a, that an optimum comfortable support surface is formed for his head. Alternatively the passenger could also arrange the item 38a on the opposite side of the head support zone 24a via the other fixation means 42a of the fixation module 36a, or could connect the item 38a to the headrest 22a via both fixation means 40a, 42a.

Principally it is also conceivable that the cover element 28a and the fixation module 36a which is fixated thereto are embodied as a separate throwaway article. It is herein conceivable that the cover element 28a is, together with the fixation module 36a, configured to be pulled over a cover of the headrest 22a that is already in place. It is herein conceivable that the cover element 28a is given to a passenger together with the fixation module 36a that is fixated thereto, and the passenger may thus arrange it on the headrest 22a on his own if he wishes, or that the cover element 28a is already fixated to the headrest 22a together with the fixation module 36a fixated thereto prior to a flight and is removed again after the flight.

In FIGS. 4 to 11 eight further exemplary embodiments of the invention are shown. The following descriptions and the drawings are substantially restricted to the differences between the exemplary embodiments, wherein regarding identically denominated structural components, in particular regarding structural components having the same reference numerals, principally the drawings and/or the description of the other exemplary embodiments, in particular of FIGS. 1 to 3, may also be referred to. For distinguishing the exemplary embodiments, the letter a has been added to the reference numerals of the exemplary embodiment of FIGS. 1 to 3. In the exemplary embodiments of FIGS. 4 to 11 the letter a has been substituted by the letters b to i.

FIG. 4 shows a second exemplary embodiment of a headrest device 10b according to the invention. The headrest device 10b is embodied as part of a seat 12b. The seat 12b is embodied substantially in the same manner as the corresponding seat of the first exemplary embodiment, also comprising a seat bottom and a backrest 20b. The headrest device 10b is part of the seat 12b and comprises a headrest 22b. The headrest 22b is arranged in an upper region of the backrest 20b. The headrest 22b is configured to implement a head support zone 24b for a passenger. The headrest 22b is herein embodied substantially identically to the corresponding headrest of the first exemplary embodiment.

The headrest device 10b comprises a fixation module 36b. The fixation module 36b is configured to allow at least one personal item, which is not shown in detail in FIG. 4, to be arranged in the head support zone 24b. An item is arrangeable captively on the headrest 22b via the fixation module 36b. In particular, an item is connectable to the headrest 22b by means of the fixation module 36b via a clamping connection.

Differently from the first exemplary embodiment, the fixation module 36b is implemented as a single module that is separate from the headrest 22b. The fixation module 36b is herein not coupled fixedly with the headrest 22b via connecting means. For the purpose of arranging the personal item in the head support zone 24b, the fixation module 36b comprises a first fixation means 40b and a second fixation means 42b. The fixation means 40b, 42b are herein embodied as individual parts. The fixation means 40b, 42b are each embodied by a strap that is closed to form a ring. Herein the fixation means 40b, 42b are implemented of an elastic strap. Thus the fixation means 40b, 42b are easily separable from the headrest 22b. In FIG. 4 the first fixation means 40b is shown in a state separate from the headrest 22b. The second fixation means 42b is shown connected to the headrest 22b. For connecting one of the fixation means 40b, 42b to the headrest 22b, they are slidable onto the headrest 22b sideways. Preferably the fixation means 40b, 42b are herein first of all stretched elastically, such that they have a circumference that is larger than a circumference of the headrest 22b, thus allowing to extend the fixation means 40b, 42b sideways over the headrest 22b. On cessation of a force causing an elastic elongation of a respective fixation means 40b, 42b, the respective fixation means 40b, 42b wraps around the headrest 22b and is pressed onto the headrest 22b by an internal spring-elastic force. In this way the respective fixation means 40b, 42b is held on the headrest 22b. For the purpose of fastening a personal item, the respective fixation means 40b, 42b may be deflected, equivalently to the first exemplary embodiment, permitting a respective personal item to be clamped between the fixation means 40b, 42b of the fixation module 36b and the headrest 22b. By the implementation of the fixation module 36b and in particular of the fixation means 40b, 42b, the fixation module 36b may be implemented in a particularly simple and cost-competitive manner. The fixation means 40b, 42b of the fixation module 36b could in particular be handed out easily by an airline individually on request. The fixation means 40b, 42b could herein be advantageously provided with a branding and/or advertisement, and could advantageously be handed out to passengers by the airline as giveaways.

In FIG. 5 a third exemplary embodiment of a headrest device 10c according to the invention is illustrated. The headrest device 10c is embodied as part of a seat 12c. The seat 12c is embodied substantially identically to the corresponding seat of the first exemplary embodiment, also comprising a seat bottom and a backrest 20c. The headrest device 10c is a portion of the seat 12c and comprises a headrest 22c. The headrest 22c is arranged in an upper region of the backrest 20c. The headrest 22c is configured to implement a head support zone 24c for a passenger. The headrest 22c is herein embodied substantially identically to the corresponding headrest of the first exemplary embodiment.

The headrest device 10c comprises a fixation module 36c. The fixation module 36c is configured to allow at least one personal item being arranged in the head support zone 24c. An item is captively arrangeable on the headrest 22c by means of the fixation module 36c. For the purpose of arranging the personal item in the head support zone 24c, the fixation module 36c comprises a first fixation means 40c and a second fixation means 42c. Differently from the first exemplary embodiment of FIGS. 1 to 3, in particular the fixation means 40c, 42c are embodied differently from one another. The first fixation means 40c is embodied as a strap. Herein the fixation means 40c embodied as a strap is implemented having only minimum elasticity. For connecting the fixation means 40c to the headrest 22c, the fixation module 36c comprises a connecting means 48c. The connecting means 48c is embodied as a substantially rectangular element, which is arranged on a lower end of the headrest 22c. The connecting means 48c is implemented by a synthetic body. A first end of the fixation means 40c that is embodied as a strap is fixedly connected to the connecting means 48c. Starting from the connecting means 48c, the fixation means 40c extends at the rear of the headrest 22c upwards and on an upper end of the headrest 22c frontwards into the head support zone 24c, and back to the connecting means 48c. The connecting means 48c has a through hole 52c, which the second end of the fixation means 40c embodied as a strap is threaded through. Herein the second end of the fixation means 40c embodied as a strap protrudes from the through hole 52c by a certain distance. To fixate a personal item to the headrest 22c by means of the fixation means 40c of the fixation module 36c, it is possible, via loosening of the fixation means 40c on the connecting means 48c, to create a space between the fixation means 40c and the headrest 22c, allowing the personal item to be introduced into it. The second end of the fixation means 40c, which has been threaded through the through hole 52c, may be lashed in place by pulling on it, and the personal item is clamped between the fixation means 40c and the headrest 22c. Principally it is of course also conceivable that the connecting means 48c is mounted in another place, e.g. on a rear side of the headrest 22c or on an upper end of the headrest 22c.

The second fixation means 42c is implemented substantially in a manner similar to the fixation means of the first exemplary embodiment. The fixation means 42c is implemented as an elastic strap. Differently from the first exemplary embodiment, the fixation means 42c is connected to the headrest 22c via two connecting means 50c, 50'c, which are embodied as form-fit elements. The connecting means 50c, 50'c embodied as form-fit elements are implemented as through holes in the fixation means 42c which is embodied as a strap. Herein, for a connection to the headrest 22c, the connecting means 50c, 50'c embodied as through holes are connected, in a form-fit manner, to the form-fit elements which are not shown in detail. The form-fit elements which are not shown in detail may herein be mounted directly on the headrest 22c or on a cover element of the headrest 22c. The form-fit elements which are not shown in detail are herein embodied, for example, as buttons or as simple bumps. Principally it is also conceivable that the connecting means 50c, 50'c embodied as form-fit elements could be embodied in a different manner that is deemed expedient by someone skilled in the art, e.g. as press studs or as a hook-and-loop fastener strap.

In FIG. 6 a fourth exemplary embodiment of a headrest device 10d according to the invention is shown. The headrest device 10d is embodied as a portion of a seat 12d. The seat 12d is embodied substantially identically to the corresponding seat of the first exemplary embodiment, also comprising a seat bottom and a backrest 20d. The headrest device 10d is part of the seat 12d and comprises a headrest 22d. The headrest 22d is arranged in an upper region of the backrest 20d. The headrest 22d is configured to implement a head support zone 24d for a passenger. The headrest 22d is herein embodied substantially identically to the corresponding headrest of the first exemplary embodiment.

The headrest device 10d comprises a fixation module 36d. The fixation module 36d is configured to allow at least one personal item 38d being arranged in the head support zone 24d. For arranging the personal item 38d in the head support zone 24d, the fixation module 36d comprises a first fixation means 40d and a second fixation means 42d. While the two fixation means 40d, 42d are implemented substantially identically to the ones of the first exemplary embodiment, the two fixation means 40d, 42d are farther distanced from a lateral end of the headrest 22d than in the first exemplary embodiment. Furthermore the two fixation means 40d, 42d have a slight inclination with respect to a vertical axis of the headrest 22d. The two fixation means 40d, 42d respectively have a same distance to a middle plane of the headrest 22d. In addition to the two fixation means 40d, 42d arranged in a middle region, the fixation module 36d comprises a third fixation means 44d and a fourth fixation means 46d. The two additional fixation means 44d, 46d are arranged in a peripheral region of the headrest 22d. Herein the two additional fixation means 44d, 46d respectively span around an upper corner 54d, 56d of the headrest 22d. The fixation means 44d, 46d herein respectively extend from an upper end of the headrest 22d to a neighboring lateral end of the headrest 22d. This allows fastening a personal item 38d both in a middle region of the headrest 22d and in an upper corner of the headrest 22d. The fixation means 40d, 42d, 44d, 46d are herein mounted to the headrest 22d via connecting means (not shown in detail), which may be equivalent to the ones of the preceding exemplary embodiments.

FIG. 7 shows a fifth exemplary embodiment of a headrest device 10e according to the invention. The headrest device 10e is embodied as part of a seat. The seat is embodied substantially identically to the corresponding seat of the first exemplary embodiment, also comprising a seat bottom and a backrest. The headrest device 10e is part of the seat and comprises a headrest 22e. The headrest 22e is arranged in an upper region of the backrest. The headrest 22e is configured to implement a head support zone 24e for a passenger. The headrest 22e implements a nape support zone 58e. For implementing the nape support zone 58e, the headrest 22e is embodied thicker in a lower region than in an upper region. Herein the nape support zone 58e comprises a middle region 60e and two side regions 62e, 64e, wherein the nape support zone 58e is in the two side regions 62e, 64e embodied differently from the middle region 60e. In the middle region 60e the nape support zone 58e is elevated along a line that runs substantially horizontally. In the side regions 62e, 64e the nape support zone 58e is elevated along an obliquely-running line, wherein the nape support zone 58e is largest at respective extreme ends of the headrest 22e. The two side regions 62e, 64e of the nape support zone 58e are herein embodied substantially symmetrically to one another.

The headrest device 10e comprises a fixation module 36e. The fixation module 36e is configured to allow at least one personal item, which is not shown in detail in FIG. 7, being arranged in the head support zone 24e. By means of the fixation module 36e, an item is arrangeable captively on the headrest 22e. In particular, by means of the fixation module 36e an item is connectable to the headrest 22e via a clamping connection. For the purpose of arranging the personal item 38 in the head support zone 24e, the fixation module 36e comprises a first fixation means 40e and a second fixation means 42e. The fixation means 40e, 42e are embodied as straps. The fixation means 40e, 42e are herein in particular embodied as elastic straps. The fixation means 40e, 42e are thus embodied to be elastically elongateable. Differently from the first exemplary embodiment of FIGS. 1 to 3, in particular the fixation means 40e, 42e are implemented differing from one another. In particular an orientation of the fixation means 40e, 42e is different from those of the previous exemplary embodiments. The fixation means 40e, 42e are respectively connected on a rear side of the headrest 22e with a first end. Herein the fixation means 40e, 42e are arranged in an upper region of the headrest 22e with their first ends. With their second ends the fixation means 40e, 42e are connected on a front side of the headrest 22e, at a lower end in the middle region 60e. The fixation means 40e, 42e thus extend obliquely in the side regions 62e, 64e. The fixation means 40e, 42e extend in the side regions 62e, 64e substantially in parallel to a line along which the headrest 22e forms the nape support zone 58e. In the middle region 60e the fixation means 40e, 42e are covered by a cover element 66e.

The headrest 22e comprises an additional cover element 66e. The additional cover element 66e is embodied as a so-called antimacassar. The additional cover element 66e is configured, as an easily removable element further covering a cover of the headrest 22e, to at least partly prevent a soiling of the headrest 22e. The additional cover element 66e is configured to be removable from the headrest 22e without requiring demounting of the headrest 22e and/or of a cover of the headrest 22e. The additional cover element 66e is herein, together with the fixation module 36e, connected to the headrest 22e. Herein the additional cover element 66e is, together with the fixation means 40e, 42e, connected to the headrest 22e via connecting means (not shown in detail) on the rear side of the headrest 22e. Principally it would also be conceivable that the additional cover element 66e is connected to the headrest 22e only via the fixation module 36e, in particular via at least one of the two fixation means 40e, 42e. In this way the additional cover element 66e is connectable to the headrest 22e in a particularly simple way, without further connecting means.

In FIG. 8 a sixth exemplary embodiment of a headrest device 10f according to the invention is shown. The headrest device 10f is embodied as part of a seat. The seat is implemented substantially in the same manner as the corresponding seat of the first exemplary embodiment, also comprising a seat bottom and a backrest. The headrest device 10f is part of the seat and comprises a headrest 22f. The headrest 22f is arranged in an upper region of the backrest. The headrest 22f is configured to form a head support zone 24f for a passenger. The headrest 22f is herein implemented substantially identically to the corresponding headrest of the fifth exemplary embodiment of FIG. 7. The headrest 22f forms a nape support zone 58f. For the purpose of forming the nape support zone 58f, the headrest 22f is embodied thicker in a lower region than in an upper region. Herein the nape support zone 58f comprises a middle region 60f and two side regions 62f, 64f wherein, differently from the fifth exemplary embodiment of FIG. 7, the nape support zone 58f is embodied in the same fashion in the two side regions 62f, 64f and in the middle region 60f.

The headrest device 10f comprises a fixation module 36f. The fixation module 36f is configured to allow at least one personal item, which is not shown in detail in FIG. 8, being arranged in the head support zone 24f. An item is captively arrangeable on the headrest 22f by means of the fixation module 36f. In particular, an item is connectable to the headrest 22f by means of the fixation module 36f via a clamping connection. For the purpose of arranging the personal item in the head support zone 24f, the fixation module 36f comprises a fixation means 40f. Differently from the other exemplary embodiments, the fixation module 36f comprises only the one fixation means 40f. The fixation means 40f is implemented as an elastic strap and is fixedly connected to the headrest 22f with its two ends via connecting means 48f, 50f. The fixation means 40f extends on a front side of the headrest 22f horizontally from a lateral end of the headrest 22f to an opposite end of the headrest 22f. In the middle region 60f the fixation means 40f is herein covered by a cover element 66f. Principally it is however also conceivable that the fixation means 40f is not covered in the middle region 60f and is embodied contiguously from the one lateral end of the headrest 22f to an opposite end of the headrest 22f.

FIG. 9 illustrates a seventh exemplary embodiment of a headrest device 10g according to the invention. The headrest device 10g is embodied as part of a seat 12g. The seat 12g is embodied substantially in the same manner as the corresponding seat of the first exemplary embodiment, also comprising a seat bottom and a backrest 20g. The headrest device 10g is part of the seat 12g and comprises a headrest 22g. The headrest 22g is arranged in an upper region of the backrest 20g. The headrest 22g is configured to form a head support zone 24g for a passenger. Differently from the previous exemplary embodiments, the headrest 22g is implemented as an integral portion of the backrest 20g. The headrest 22g is embodied as an upper region of the backrest 20g. In particular, the seat 12g does not comprise an additional structural component which is separable from the backrest 20g and forms the headrest 22g.

The headrest device 10g comprises a fixation module 36g. The fixation module 36g is configured to allow at least one personal item, which is not shown in FIG. 7, being arranged in the head support zone 24g. By means of the fixation module 36g, an item is arrangeable on the headrest 22g captively. In particular, an object is connectable to the headrest 22g by means of the fixation module 36g via a clamping connection. For the purpose of arranging the person item in the head support zone 24g, the fixation module 36g comprises a first fixation means 40g and a second fixation means 42g. The fixation means 40g, 42g are embodied as straps. The fixation means 40g, 42g are herein in particular embodied as elastic straps. The fixation means 40g, 42g are in this way embodied to be elastically elongateable. The two fixation means 40g, 42g are arranged in a peripheral region of the headrest 22g. Herein the two fixation means 40g, 42g respectively span around an upper corner 54g, 56g of the headrest 22g, implemented by the upper corners of the backrest 20g. The fixation means 40g, 42g herein respectively extend from an upper end of the backrest 20g to a neighboring lateral end of the backrest 20g.

In FIG. 10 an eighth exemplary embodiment of a headrest device 10h according to the invention is illustrated. The headrest device 10h is embodied as part of a seat. The seat is embodied substantially in the same manner as the corresponding seat of the first exemplary embodiment, also comprising a seat bottom and a backrest. The headrest device 10h is a portion of the seat and comprises a headrest 22h. The headrest 22h is arranged in an upper region of the backrest. The headrest 22h is configured to implement a head support zone 24h for a passenger. The headrest 22h is herein depicted in FIG. 10 in a sectional view.

The headrest device 10h comprises a fixation module 36h. The fixation module 36h is configured to allow at least one personal item, which is not shown in detail in FIG. 10, being arranged in the head support zone 24h. By means of the fixation module 36h, an item is arrangeable on the headrest 22h captively. In particular, an item is connectable to the headrest 22h by means of the fixation module 36h via a clamping connection. For the purpose of arranging the personal item in the head support zone 24h, the fixation module 36h comprises a fixation means 40h. The fixation means 40h comprises two elastic partial regions 68h, 70h. The elastic partial regions 68h, 70h are in particular embodied as elastic straps. The partial regions 68h, 70h of the fixation means 40h are thus embodied elastically elongateable. Herein the partial regions 68h, 70h of the fixation means 40h may in particular be embodied of a material like the corresponding fixation means of the preceding exemplary embodiments. The partial regions 68h, 70h of the fixation means 40h herein extend on a rear side 74h of the headrest 22h. In particular, the partial regions 68h, 70h of the fixation means 40h are arranged in a non-visible region of the headrest 22h. Herein it is in particular conceivable that he partial regions 68h, 70h of the fixation means 40h are arranged underneath a cover of the headrest 22h. Principally the partial regions 68h, 70h may also be arranged at least partly within the headrest 22h. The fixation means 40h comprises an inelastic partial region 72h. The inelastic partial region 72h is arranged between the two elastic partial regions 68h, 70h. The inelastic partial region 72h is connected to the one elastic partial region 68h with a first end. With a second end the inelastic partial region 72h is connected to the other elastic partial region 70h. Herein the inelastic partial region 72h is fixedly connected to the elastic partial regions 68h, 70h via at least one seam respectively. It is principally also conceivable that the partial regions 68h, 70h, 72h are interconnected in another fashion that is deemed expedient by someone skilled in the art. The inelastic partial region 72h is herein implemented of a material having minimum elasticity. The inelastic partial region 72h is herein made of leather. Principally it is also conceivable that the inelastic partial region 72h is made of a different material, e.g. of a fabric or of a synthetic material. Preferably the inelastic partial region 72h herein has a particularly high valuableness. The fixation means 40h is connected to the headrest 22h via a connecting element 74h. The connecting element 74h connects the two elastic partial regions 68h, 70h together to the rear side of the headrest 22h. The connecting element 74h is herein implemented as a press stud. Of course, differently implemented connecting elements are herein principally also conceivable. Principally it is also conceivable that the partial regions 68h, 70h of the fixation means 40h are each connected to the headrest 22h individually via a suitable connecting element. Herein it is in particular also conceivable that the partial regions 68h, 70h of the fixation means 40h are connected to the headrest 22h in different points. For the purpose of connecting a personal item, a passenger may pull on the inelastic partial region 72h of the fixation means 40h, as a result of which the elastic partial regions 68h, 70h are elastically elongated accordingly. It is then possible to get the personal item clamped in a space thus created between the inelastic partial region 72h of the fixation means 40h and the headrest 22h. Principally it is conceivable that the fixation module 36h comprises further fixation means 40h, which are distributed over the head support zone 24h of the headrest 22h.

FIG. 11 shows a ninth exemplary embodiment of a headrest device 10i according to the invention. The headrest device 10i is implemented as part of a seat. The seat is embodied substantially in the same way as the corresponding seat of the first exemplary embodiment, also comprising a seat bottom and a backrest. The headrest device 10i is a portion of the seat and comprises a headrest 22i. The headrest 22i is arranged in an upper region of the backrest. The headrest 22i is configured to implement a head support zone 24i for a passenger. In FIG. 10 the headrest 22i is herein depicted in a sectional view.

The headrest device 10i comprises a fixation module 36i. The fixation module 36i is configured to allow at least one personal item, which is not shown in detail in FIG. 11, being arranged in the head support zone 24i. By means of the fixation module 36i an object is arrangeable captively on the headrest 22i. In particular, the object is connectable to the headrest 22i by means of the fixation module 36i via a clamping connection. For the purpose of arranging the personal item in the head support zone 24i, the fixation module 36i comprises a fixation means 40i. The fixation means 40i is herein implemented as an inelastic strap. The fixation means 40i is herein made of a material having minimum elasticity. The fixation means 40i is herein implemented of leather. The fixation means 40i comprises a clamping and storage device 76i. The clamping and storage device 76i is configured for tensioning and at least partly accommodating the fixation means 40i. The clamping and storage device 76i is embodied as a spring-loaded rolling-up device. The fixation means 40i is rolled on a roll of the clamping and storage device 76i. The roll of the clamping and storage device 76i is herein pre-biased via a spring (not shown) and exerts a rolling-in force onto the fixation means 40i. The fixation means 40i is fixedly connected to the roll of the clamping and storage device 76i with its first end. The clamping and storage device 76i is herein arranged on a rear side of the headrest 22i on an upper end thereof.

The clamping and storage device 76i may principally also be integrated in the headrest 22i and/or in the backrest. Herein the clamping and storage device 76i would be arranged at least substantially within the headrest 22i or the backrest, respectively. A second end of the fixation means 40i implements a form-fit element 78i. On an underside of the headrest 22i, the fixation module 36i comprises a form-fit element 80i, which is embodied corre-spondingly to the form-fit element 78i of the fixation means 40i. The form-fit elements 78i, 80i are herein implemented as a press-stud connection. In a stowed state, the fixation means 40i is rolled on the roll of the clamping and storage device 76i and only the second end with the form-fit element 78i protrudes from a housing of the clamping and storage device 76i. For the purpose of arranging a personal item, a passenger may then grasp the fixation means 40i and roll it off the roll of the clamping and storage device 76i by pulling, he may then place the personal item between the headrest 22i and the fixation means 40i and may fixate the fixation means 40i with its form-fit element 78i to the form-fit element 80i of the fixation module 36i on the headrest 22i. The fixation means 40i is tensioned by the spring-loaded roll of the clamping and storage device 76i and the personal item is clamped between the fixation means 40i and the headrest 22i. Principally it is conceivable that the fixation module comprises further fixation means 40i, each of which is mounted via a respective clamping and storage device 76i.

REFERENCE NUMERALS 10 headrest device
12 seat
14 seat row
16 mounting unit
18 seat bottom
20 backrest
22 headrest
24 head support zone
26 base body
28 cover element
30 rubber element
32 support unit
34 motion axis
36 fixation module
38 item
40 fixation means
42 fixation means
44 fixation means
46 fixation means
48 fixation means
50 fixation means
52 through hole
54 corner
56 corner
58 nape support zone
60 middle region
62 side region
64 side region
66 cover element
68 elastic partial region
70 elastic partial region
72 non-elastic partial region
74 connecting element
76 clamping and storage device
78 form-fit element
80 form-fit element

The invention claimed is:

1. A headrest device for a seat, in particular for an airplane seat, with a headrest implementing at least one head support zone, wherein
   the headrest device comprises at least one fixation module with at least one fixation means, which is configured to arrange at least one personal item in the head support zone,
   the at least one fixation means includes a first end and a second end, and the second end is connected on a front side of the headrest, at a lower end of the headrest and in a middle region of the headrest, the headrest comprises at least one additional cover element, which is configured to be arranged on the headrest together with the fixation module, and the additional cover element covers the second end on a front side of the headrest.

2. The headrest device according to claim 1, wherein the fixation means comprises an elastic strap.

3. The headrest device according to claim 1, wherein the at least one fixation means is connected on a rear side of the headrest with the first end.

4. A headrest device for a seat, in particular for an airplane seat, with a headrest implementing at least one head support zone, comprising at least one fixation module with at least one fixation means, which is configured to arrange at least one personal item in the head support zone, wherein the fixation means comprises at least one elastic portion and an inelastic portion, and wherein the at least one elastic portion is arranged on a rear side of the headrest.

5. A headrest device for an airplane seat, wherein the airplane seat includes a headrest with at least one head support zone, which is formed by a comfort element, the airplane seat includes a backrest, and the headrest is separate from and connected to the backrest, the headrest includes a base body and a cover element, and the cover element is separable from the base body, in a mounted state, the cover element covers the base body and the comfort element so that the cover element completely covers a front side of the comfort element, the headrest device includes at least one elastic strap, which is configured to hold at least one personal pillow or item of clothing between the strap and the head support zone, and the at least one strap is fastened to the cover element.

6. The headrest device according to claim 5, wherein the elastic strap is one of two elastic straps that are fastened to the cover element.

7. The headrest device according to claim 6, wherein the elastic straps are located on opposite sides of the head support zone.

8. The headrest device according to claim 5, wherein the elastic strap is sewn to the cover element.

* * * * *